March 24, 1942.   R. BOCK   2,277,065
PRISM-MONOCULAR
Filed Oct. 2, 1939
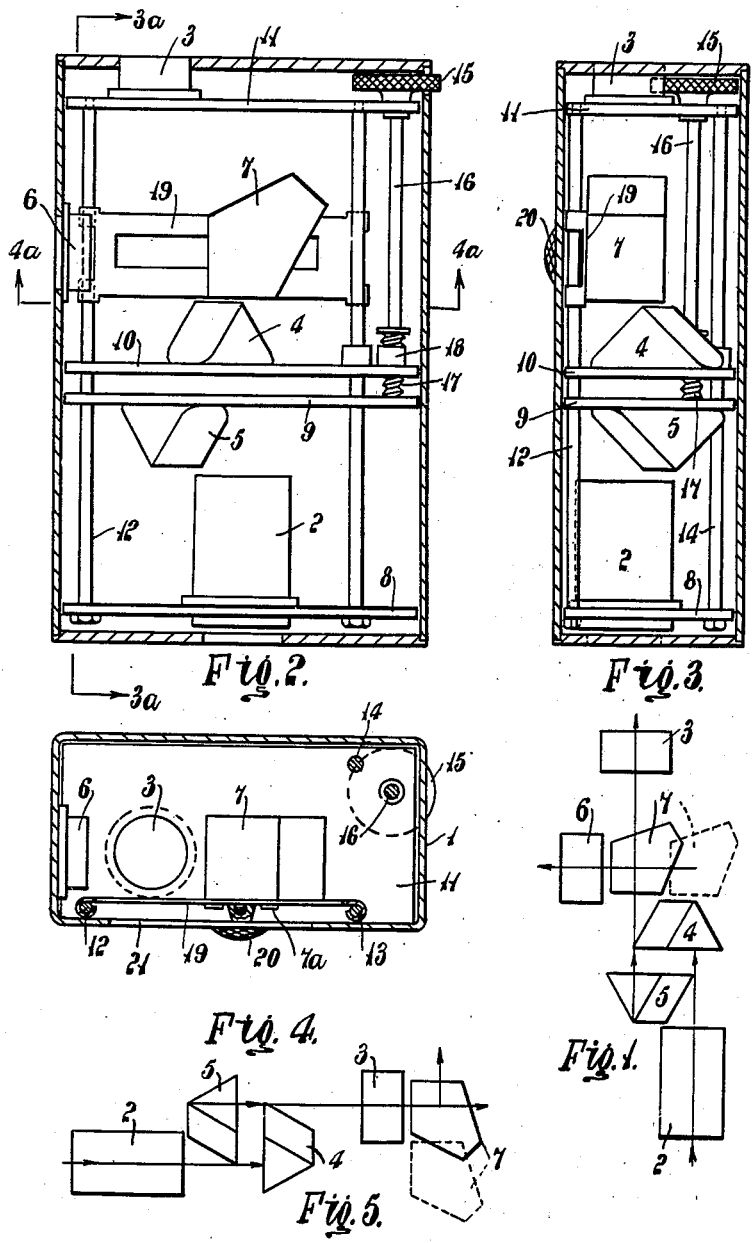
INVENTOR
RICHARD BOCK
BY Kimmel & Crowell
ATTORNEYS Patented Mar. 24, 1942

2,277,065

UNITED STATES PATENT OFFICE 2,277,065

PRISM-MONOCULAR

Richard Bock, London, England

Application October 2, 1939, Serial No. 297,609
In Great Britain October 5, 1938

8 Claims. (Cl. 88—33)

The present invention relates to a prism-monocular of the kind in which the prisms are so arranged that it is possible to deflect the line of vision laterally in order to view objects in either of two angularly separate directions at will without changing the position of the body of the instrument.

The invention has for its object to provide, in a manner as hereinafter set forth, an instrument of this kind with the aid of which an observer can observe objects in either of two angularly separate directions at will, without changing the position of the body of the instrument. For example, the instrument can be so constructed that the observer can either look directly through it at an object in front of him or can adjust the instrument so that he observes, instead, an object to his side.

Another object of this invention is to provide a pocket size monocular comprising in combination a casing including sides and front and rear ends, openings formed in the front and rear ends of said casing and disposed in off-set relationship, an opening formed in one of said sides between the ends thereof, an eye piece disposed in the casing in proximity to and aligned with the opening in the rear end, an objective mounted in the opening in said front end and offset with respect to said eye piece, a second objective mounted in the opening in said side and off set with respect to said eye piece, a pair of doubly reflecting prisms disposed in spaced relationship within the casing and between said eye piece and said first mentioned objective, one of said prisms being closely adjacent to said eye piece, means for adjusting the prisms of said pair towards and away from each other, a movable doubly reflecting element within the casing between said first mentioned objective and said pair of prisms, one of the latter being closely adjacent to said element, a slide supporting said element and means for adjusting the position of the element on said slide operable from the exterior of the casing for selective correlation of the element with said objectives.

A still further object is to provide a modified form of the instrument referred to above in which use is made of a single objective, instead of two objectives, for observing in both directions. In this case the single objective is located between the eye piece and the reflecting element and adjacent to the latter, suitable ports or apertures being provided in the casing in the relative positions which, in the form of the invention just previously referred to, were occupied by the objectives.

In order that the invention may be clearly understood and readily carried into effect, reference will now be made to the accompanying drawing which illustrates, purely by way of example only, a compact prism monocular or telescope.

On the drawing:

Fig. 1 is a diagram showing the relative positions of the various parts;

Fig. 2 is a part sectional plan view showing one way of mounting the various parts for insertion into a casing;

Fig. 3 is a section taken on the line 3a, 3a of Fig. 2;

Fig. 4 is a section taken on the line 4a, 4a of Fig. 2;

Fig. 5 is a diagram similar to Fig. 1, but illustrating a modification according to which it is necessary only to use a single objective.

Referring to Fig. 1 of the drawing the instrument comprises an eye-piece 2 which is provided at one end of a casing and an achromatic objective 3 in the other end. The axes of the eye-piece and objective are offset from one another and a pair of doubly reflecting prisms 4 and 5 are provided in known manner for directing the light from the objective 3 into the eye-piece 2. The prism 5 reflects the light back from the objective 3 along a parallel path to the prism 4 which then reflects it into the eye-piece 2. This enables a relatively long optical path to be obtained as compared with the over-all length of the instrument. One of the prisms is made movable relatively to the other to enable the effective separation between the objective 3 and eye-piece 2 to be varied and the instrument is focussed by this means. In the example shown the prism 4 is movable.

A second achromatic objective 6 similar to the other is provided in one side or edge of the casing at the objective end of the latter and a pentagonal prism 7, which is preferably of the double reflecting type to avoid inversion of the image, is mounted within the casing on a slidable or otherwise movable support in such a way that it may be moved from the full line position, in which it reflects the light from the side objective 6 to the eye-piece 2 while obstructing the light from the other objective 3, to the dotted line position in which it allows the light from this front objective 3 to reach the eye-piece. An important property of the pentagonal prism is that small rotations about an axis perpendicular to the plane of Fig. 1 of the drawing does not affect or shift the image, hence the slide for the prism need not be very accurate.

The various parts of the instrument can be mounted in the casing in any suitable manner. Figures 3, 4 and 5 show, merely by way of example only, one method of mounting the parts. Referring to these figures, the casing is indicated at 1 and the eye-piece 2, prism 5, prism 4 and the objective 3 are supported respectively by plates 8, 9, 10 and 11 supported and held in proper spaced relationship by rods 12, 13 and 14. The plate 10 however, is adjustable longitudinally of the casing 1 by rotating a knurled nut 15 fast on a rod 16 which is formed with a quick pitch worm 17 which engages within a suitable threaded collar 18 fixed to the plate 10. Rotation of the knurled nut 15, by actuating that part which protrudes through the side of the casing, results in the plate 10 being moved towards or away from the plate 9 and consequently the prism 4 is moved towards or away from the prism 5 permitting the instrument to be focussed.

The plates are of course apertured to accommodate the eye-piece, prisms and the objective 3.

The pentagonal prism 7 is mounted to slide transversely of the casing on an apertured plate 19 which bridges the rods 12 and 13 (see Fig. 4) the prism 7 being secured, after the parts are assembled in the casing 1, to a finger-actuating piece 20 slidable in a slot 21 in the adjacent wall of the casing. Turned-over portions 7a hold the prism 7 in engagement with the slide and also guides the prism when it is moved. If desired, it can be arranged that the finger-piece 20 moves a shutter as it is moved itself to keep the slot 21 closed and so prevent ingress of dust to the casing.

It is to be clearly understood that the means shown in Figs. 2, 3 and 4 for supporting the various parts and for moving the prisms 4 and 7 can be replaced by other suitable means. For example, the prism 7 can be moved by a pivoted lever formed with a forked portion which engages a pin extending from the casing of the prism. The lever would preferably be pivoted at such a point that it would only extend for a short distance outside the casing and that slight movement of this extending part would produce the desired movement of the prism 7. The advantage of such an arrangement would be that the lever could operate in a short slot in the wall of the casing. Further it could be arranged that the prism 7 is moved in one direction against the influence of a spring, the spring being allowed to reassert itself to return the prism to its original position. Detents could be provided for maintaining the prism 7 in either of its selected positions.

The casing 1 is preferably of a flat rectangular shape and such a size that it may be readily carried in a pocket or ladies' handbag.

The uses to which the instrument according to this invention can be put are numerous, but it is chiefly intended to be used in public places, such as restaurants, dance halls, theaters or public gatherings, as it enables personalities to be viewed without looking in their direction and thereby causing embarrassment. For this reason the prism-monocular according to the invention is preferably made so that the user can look directly through it at an object in front of him or can adjust the instrument so that he observes, instead, an object to his side.

Fig. 5 illustrates diagrammatically the arrangement should it be desired to make use of only one objective. In this case the objective 3 would be located between the eye-piece 2 and the view changing prism 7, adjacent the latter, suitable ports or apertures being provided in the casing in the positions which in the previously described construction were occupied by the objectives. This arrangement, while avoiding the necessity of providing two objectives, suffers from the disadvantage that the casing must be larger for a given separation between the objective and eye-piece and thus it is not possible to provide such a high magnification in an instrument of given size as can be obtained with the aid of two separate objectives.

Although it is preferred to move one of the right angle prisms relatively to the other to focus the instrument it can be arranged that both the right angle prisms are held stationary and the eye-piece moved instead towards and away from the adjacent prism.

I claim:

1. A prism-monocular for the purpose set forth comprising a casing including a pair of sides and front and rear ends, said rear being formed with an opening therein, said front being formed with an opening between its center and one of said sides, said one of said sides being formed with an opening between its center and said front end, an eyepiece within the rear portion of the casing and aligning with said opening in said rear end, an achromatic objective arranged at the opening in the front portion of and within the casing, a second achromatic objective arranged at the opening in the side of the casing rearwardly of said first mentioned objective, and offset relative to said eyepiece, a pentagonal prism within said casing and opposing said second objective, front and rear oppositely disposed doubly reflecting prisms arranged within the casing between the pentagonal prism and said eyepiece, said front and rear prisms being offset with respect to the axis of said eyepiece and with respect to the axis of the first objective.

2. A prism-monocular for the purpose set forth comprising a casing including a pair of sides and front and rear ends, said rear being formed with an opening, said front being formed with an opening offset with respect to said rear opening, said one of said sides being formed with an opening between its center and said front end, an eyepiece within the rear portion of the casing and aligning with said opening in said rear end, an achromatic objective arranged in the front portion of the casing and in line with the opening in said front end, a second achromatic objective arranged in the front portion of the casing rearwardly of said first mentioned objective and aligning with the opening in the said one side, a pentagonal prism within said casing and opposing said second objective, a pair of oppositely disposed doubly reflecting prisms arranged within the casing between the pentagonal prism and said eyepiece, said prisms being offset with respect to the axis of the first objective, means within the casing for slidably supporting said pentagonal prism, and means within the casing for adjusting one of said doubly reflecting prisms relative to the other.

3. In a prism-monocular for the purpose set forth, a casing including front and rear ends, said rear end being formed with an opening therein, said front end being formed with an opening between its center and one side of the casing, an eyepiece within the rear portion of the casing and aligning with the opening in said rear end, an achromatic objective arranged in the front portion of the casing and aligning with the opening in said front end, a second achromatic objective arranged in the front portion of the casing rearwardly of said first mentioned objective, aligning with an opening in one side wall and offset relative to the said eyepiece, front and rear double reflecting prisms disposed in spaced relationship within the casing, said prisms being disposed in offset relationship with respect to the axis of said eyepiece, a pentagonal prism within the casing between said front prisms and said front end, and means to movably support said pentagonal prism in opposition to the said second objective and in operative relationship with said objective, the doubly reflecting prisms and the eyepiece.

4. In a prism-monocular for the purpose set forth, a casing including front and rear ends, said rear end being formed with an opening therein, said front end being formed with an opening between its center and one side of the casing, an eyepiece within the rear portion of the casing and aligning with the opening in said rear end, an achromatic objective arranged in the front portion of the casing and aligning with the opening in said front end, a second achromatic objective arranged in the front portion of the casing rearwardly of said first mentioned objective, aligning with an opening in one side wall and offset relative to the said eyepiece, a front and a rear double reflecting prism arranged one in offset relationship with the other within the casing, said prisms being disposed in offset relationship with respect to the axis of said eyepiece, a pentagonal prism within the casing between said front prism and said front end, means to movably support said pentagonal prism in opposition to the said second objective and in operative relationship with said objective, the doubly reflecting prisms and the eyepiece, and means within the casing for adjusting said front prism relative to said rear prism.

5. A pocket size monocular comprising in combination a casing including sides and front and rear ends, openings formed in the front and rear ends of said casing and disposed in offset relationship, an opening formed in one of said sides between the ends thereof, an eye piece disposed in the casing in proximity to and aligned with the opening in the rear end, an objective mounted in the opening in said front end and offset with respect to said eye piece, a second objective mounted in the opening in said side and offset with respect to said eye piece, a pair of doubly reflecting prisms disposed in spaced relationship within the casing and between said eye piece and said first mentioned objective, one of said prisms being closely adjacent to said eye piece, means for adjusting the prisms of said pair towards and away from each other, a movable doubly reflecting element within the casing between said first mentioned objective and said pair of prisms, one of the latter being closely adjacent to said element, a slide supporting said element and means for adjusting the position of the element on said slide operable from the exterior of the casing for selective correlation of the element with said objectives.

6. A pocket size monocular comprising in combination a casing including sides and front and rear ends, openings formed in the front and rear ends of said casing and disposed in offset relationship, an opening in one of said sides formed between the ends of said side, an eye piece disposed in the casing in proximity to and aligned with the opening in the rear end, a pair of doubly reflecting prisms disposed in spaced relationship within the casing, means for adjusting the prisms of said pair towards and away from each other, and a double reflecting element within the casing movable into and out of operative position transversely of the optical axis of the monocular, an objective within the casing between the pair of doubly reflecting prisms and the said movable double reflecting element, a slide supporting said element, and means for adjusting the position of the element on said slide operable from the exterior of the casing for selective correlation with the openings in the front and side of the casing.

7. A pocket size monocular as claimed in claim 5 wherein the axes of the said objectives are in the same plane, and wherein the path of movement of the said doubly reflecting element is parallel to the said plane.

8. A pocket size monocular as claimed in claim 5, wherein the said doubly reflecting element consists of a pentagonal prism arranged for rectilinear slidable movement.

RICHARD BOCK.